Patented Aug. 15, 1950

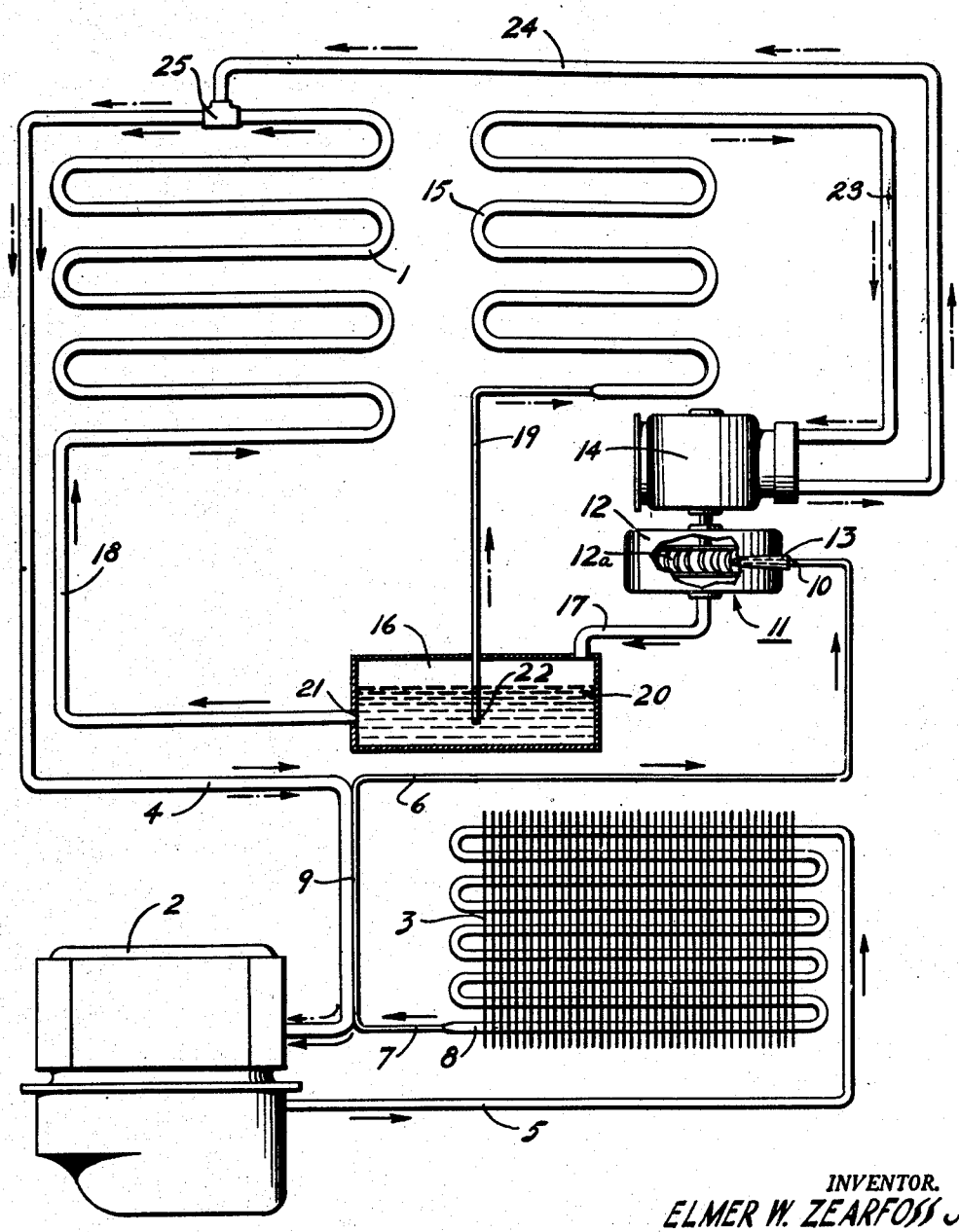

2,519,010

UNITED STATES PATENT OFFICE 2,519,010

REFRIGERATION SYSTEM AND METHOD

Elmer W. Zearfoss, Jr., Philadelphia, Pa., assignor to Philco Corporation, Philadelphia, Pa., a corporation of Pennsylvania Application August 2, 1947, Serial No. 765,767

6 Claims. (Cl. 62—115)

The present invention relates to refrigeration and, particularly, to a refrigerating method and system in which volatile refrigerant is exposed to various pressure conditions, so that such refrigerant is evaporated and condensed to obtain the desired refrigeration effect.

Refrigerating systems of the kind here contemplated are generally provided with an evaporator in which low pressure liquid refrigerant vaporizes and absorbs heat in the process; with a compressor in which low pressure vaporized and heat-laden refrigerant is compressed to increase its pressure to a value corresponding to a saturation temperature well above normal atmospheric temperature; with a condenser in which high pressure vaporized refrigerant rejects heat to the ambient air and reverts to liquid state; and, with a pressure reducing device in which the high pressure liquid refrigerant is subjected to a throttling process effective to bring the liquid refrigerant down to the low evaporating pressure. During operation, the pressure reducing device imposes resistance to the flow of refrigerant and, consequently, maintains the necessary pressure difference between the high pressure side and the low pressure side of the system. This pressure difference causes the refrigerant to move at high velocity which, in turn, causes the refrigerant to acquire considerable kinetic energy. Kinetic energy in refrigerant flowing from the high pressure side to the low pressure side of the system ultimately changes into heat energy which deleteriously affects the thermodynamic cycle. This heat represents a loss of refrigerating effect in the evaporator and results in a decreased coefficient of performance.

It is, therefore, the primary purpose of the present invention to increase the coefficient of performance by recovering the loss of refrigerating effect which is mainly due to the potential heat energy content of refrigerant passing from the high pressure side to the low pressure side of the system. This purpose of the invention is achieved by interposing between the condenser and the evaporator, means effective to obtain adequate control of the refrigerant flow while maintaining the refrigerant in a condition which enables it to produce optimum refrigerating effect.

It is also an object of this invention to prevent kinetic energy of refrigerant passing from the high pressure side to the low pressure side of the system, from turning into heat energy susceptible of impeding the thermodynamic cycle and of lessening the refrigerating effect. To accomplish this object, the invention provides a method and means whereby kinetic energy in refrigerant is effectively taken out as the refrigerant passes into the low pressure side of the system, so that refrigerant at the entrance of the evaporator is rid of the greatest part of its potential heat energy and, therefore, is available to produce maximum refrigerating effect.

Another object of the present invention is to convert, into mechanical energy, kinetic energy possessed by refrigerant which flows from the high pressure side to the low pressure side of the refrigerating system. Basically, this object of the invention is obtained by causing refrigerant, after leaving the condenser and before reaching the evaporator, to spend part of its energy in doing work on a mechanical contrivance included in the system between the condenser and the evaporator.

Still another object of the invention is to put to useful work the kinetic energy which exists in refrigerant emerging into the low pressure side of the refrigerating system. To that end, the invention employs an energy converter adapted to transform such kinetic energy into mechanical energy and, thereby, to develop energy which can be advantageously utilized to assist in the operation of the system.

A further and more specific object of the invention is to simplify the construction and to increase the performance of a refrigerating system including a single condensing unit and two primary evaporators, one to function within a temperature range different from the temperature range within which the other evaporator is to function. The construction is such that the thermodynamic cycle is not adversely influenced by the presence of an additional evaporator in the system. In realizing this feature, the invention utilizes part of the energy of refrigerant flowing in a main circuit, which includes the higher-temperature evaporator, to operate an auxiliary compressor unit in an auxiliary circuit, which includes the lower-temperature evaporator.

These and other objects of the invention, and the manner in which they are obtained, will be more fully understood from the following description based on the accompanying drawing, the single figure of which diagrammatically illustrates a practicable embodiment of a refrigerating system constructed in accordance with this invention.

As shown, the system basically includes an evaporator 1 and a condensing unit, the latter comprising a motor-compressor 2 and a condenser 3. The motor compressor is adapted to withdraw heat-laden refrigerant from the evaporator, through suction line 4, and to discharge compressed refrigerant vapor into the condenser, through duct 5. In the condenser, the vapor is returned to liquid state for feeding to the evaporator, through conduit means which will now be described.

A pressure reducing device is provided to control the flow of refrigerant passing out of the condenser. In the drawing, this device is shown as a capillary tube 6 which has its inlet 7 connected with the outlet 8 of the condenser so that liquid refrigerant, at condensing pressure, enters the capillary tube for passage therethrough. A portion of this tube, according to the usual practice and as indicated at 9, is arranged in heat exchange relationship with suction line 4. Capillary tube 6 restricts the flow of refrigerant and progressively reduces the refrigerant pressure so that refrigerant, at outlet 10 of said tube, is at low or evaporating pressure. As a result of the throttling process which takes place in the capillary tube, refrigerant ejected from outlet end 10 travels at high velocity and, therefore, possesses increased kinetic energy which, is hereinbefore stated, is normally dissipated as heat energy detrimental to the refrigerating effect.

In the embodiment of the invention as illustrated in the drawing, means, generally indicated at 11, is adapted to absorb kinetic energy from refrigerant passed by the capillary tube prior to the admittance of such refrigerant into the evaporator. The absorption of kinetic energy from the refrigerant passing out of the capillary tube, effectively reduces potential heat energy possessed by the throttled refrigerant, and therefore, improves the refrigerating effect in the evaporator with the result that the over-all efficiency of the system is enhanced. In a system arranged as illustrated in the drawing, kinetic energy in the refrigerant is advantageously transformed into mechanical energy by using a suitable energy converter, such as a turbine 12. The turbine is so disposed that kinetic energy in the refrigerant which is discharged by the capillary tube, spends itself in driving the turbine. For that purpose, the outlet end 10 of the capillary tube is connected with inlet 13 of the turbine so that the capillary tube acts as a nozzle which directs the refrigerant moving at high velocity against the usual rotor 12a of the turbine.

With an arrangement of this kind, kinetic energy which the throttled refrigerant contains, can be employed to perform useful work. For instance, in the arrangement illustrated in the drawing, the energy which is generated in turbine 12 as a result of the work done upon it by the flowing refrigerant, is utilized to drive an auxiliary compressor 14. This compressor is conveniently arranged in an auxiliary circuit which includes a second evaporator 15. Thus, a two temperature system is readily provided in which the additional evaporator 15, as will be presently explained, can be operated within a temperature range lower than that of evaporator 1 in the main circuit.

In the system as shown, refrigerant from turbine 12 accumulates in a receiver 16, which is conveniently connected with discharge 17 of the turbine. From the receiver, refrigerant flows to evaporator 1 through feed line 18 and to evaporator 15 through feed line 19. During normal operation of the system and as is represented at 20, liquid refrigerant in receiver 16 is maintained at a level well above the inlet 21 of feed line 18 and also well above the inlet 22 of feed line 19. In this manner, an ample supply of liquid refrigerant is assured for both evaporators. Feed line 18 is such as to impose no noticeable restriction to the refrigerant flow so that the pressure and, consequently, the boiling point of the refrigerant are not substantially affected by the passage of the refrigerant from received 16 to evaporator 1. However, feed line 19 is adapted to impose substantial resistance to the refrigerant flow so as to reduce the pressure and boiling point of refrigerant which flows from receiver 16 to evaporator 15. Therefore, refrigerant in the last mentioned evaporator, will evaporate at a lower pressure than does refrigerant in evaporator 1 and, accordingly, evaporator 15 is able to maintain lower temperatures than does evaporator 1. Refrigerant vapor which exists at lowered pressure in the evaporator 15, flows through line 23 into auxiliary compressor 14 which functions to raise the pressure of said refrigerant vapor to a value compatible with that of the refrigerant vapor flowing from the evaporator 1. From the auxiliary comperssor, the vapor flows through conduit 24 which, as indicated at 25, communicates with suction line 4 of the main circuit. Thus, vaporized refrigerant from both evaporators passes to the condensing unit (motor-compressor 2 and condenser 3) and is therein compressed and liquified to repeat the cycle above described.

In practice, evaporators 1 and 15 are adapted to be mounted in separate compartments within an insulated portion of a cabinet (not shown). Condensing unit 2—3 is adapted to be mounted in a machinery compartment provided in the cabinet. Turbine-compressor unit 12—14 and receiver 16, and their associated conduits, are installed within the cabinet insulation so as not to be affected by ambient air.

From the foregoing, it will be appreciated that the invention provides a simple yet dependable arrangement whereby kinetic energy which develops in refrigerant flowing from the high pressure side to the low pressure side of a refrigerating system, is prevented from deleteriously affecting the thermodynamic cycle of the system. Moreover, part of the energy in throttled refrigerant is put to work to better the operation of the system by recovering those losses in refrigerating effect which are due to the throttling process. Particularly, the use of the invention in a two temperature system, as hereinabove described, not only provides for recovery of throttling losses, but is uniquely advantageous in obtaining adequate operation of the evaporators within their respective temperature ranges.

It will be understood that, as in most capillary tube systems, the refrigerant which emerges from tube 6 is in the form of a mixture of liquid and gas. In the arrangement shown in the drawings, this mixture of liquid and gas refrigerant is discharged into the receiver 16. Gas accumulating in the receiver, may tend to displace the liquid so as to cause a fall of the liquid level in said receiver. However, it will be understood that should the liquid level fall to the inlet of the feed lines 18 and 19, gas, together with slugs of liquid, will pass through said lines, and the liquid which continues to discharge into the receiver will again cause the liquid level to rise.

I claim:
1. In a refrigerating system, an evaporator, a condensing unit, conduit means for delivering refrigerant from said evaporator to said unit, other conduit means for delivering refrigerant from said unit to said evaporator, an energy converter for transforming, into mechanical energy, part of the energy in refrigerant flowing through said conduit means, a second evaporator having communication with both conduit means, and means arranged in cooperative relationship with the second evaporator and connected with the energy converter to be driven by the mechanical energy produced thereby, to effect circulation of refrigerant through said second evaporator.

2. In a refrigerating system, an evaporator, a condensing unit, conduit means for delivering refrigerant from said evaporator to said unit, other conduit means for delivering refrigerant from said unit to said evaporator and including a pressure reducing device for receiving refrigerant at condensing pressure from said unit and for delivering refrigerant at evaporating pressure for feeding to said evaporator, an energy converter disposed at the discharge end of the pressure reducing device to transform, into mechanical energy, part of the energy in refrigerant discharged by said device, a second evaporator having communication with both of said conduit means, and means arranged in cooperative relationship with the second evaporator and connected with the energy converter to be driven by the mechanical energy produced thereby, to effect circulation of refrigerant through said second evaporator.

3. In a refrigerating system, an evaporator, a condensing unit, conduit means for delivering refrigerant from said evaporator to said unit, other conduit means for delivering refrigerant from said unit to said evaporator and including a capillary tube for receiving refrigerant at condensing pressure from said unit and for delivering refrigerant at evaporating pressure for feeding to said evaporator, a turbine disposed at the discharge end of the capillary tube and arranged to be driven by the flow of refrigerant discharged by said tube, a second evaporator having communication with both of said conduit means, and an auxiliary compressor arranged in cooperative relationship with the second evaporator and connected with said turbine to be driven thereby, to effect circulation of refrigerant through said second evaporator.

4. In a refrigerating system, a pair of evaporators, a condensing unit including a compressor and a condenser, a restrictor tube connected with the condenser to receive refrigerant at condensing pressure and to discharge refrigerant at evaporating pressure, a turbine connected with the restrictor tube and arranged to be driven by the flow of refrigerant discharged by said tube, a receiver connected with said turbine to receive refrigerant discharged therefrom, a feed line disposed between said receiver and one evaporator and adapted to feed refrigerant at one evaporating pressure to said evaporator, a feed line disposed between said receiver and the other evaporator and adapted to feed refrigerant at lower evaporating pressure to said other evaporator, an auxiliary compressor connected with said other evaporator and with said turbine to be driven thereby for compressing refrigerant evaporated at the lower evaporating pressure to a pressure compatible with the pressure of the refrigerant evaporated in the first mentioned evaporator, and conduit means providing for the return of refrigerant from the first mentioned evaporator and from the auxiliary compressor to the compressing unit.

5. That method of producing refrigeration which comprises reducing the pressure of refrigerant from a high condensing pressure to a low evaporating pressure, converting, into mechanical energy, kinetic energy in the low pressure refrigerant, evaporating a portion of said refrigerant at the low evaporating pressure, further reducing the pressure of another portion of said refrigerant at the further lowered evaporating pressure, utilizing said mechanical energy to compress the refrigerant evaporated at said further lowered evaporating pressure to a value compatible with the pressure of the evaporated first mentioned portion of the refrigerant, compressing and condensing the vapor of both of said portions of refrigerant, and repeating the cycle.

6. In a refrigerating system, a main compressor, a condenser and an evaporator in series flow circuit, a turbine interposed in the circuit between the condenser and the evapoartor and adapted to be driven by the flow of refrigerant passing from said condenser to said evaporator, and an auxiliary compressor interposed in the circuit between the evaporator and the main compressor and connected with said turbine to be driven thereby.

ELMER W. ZEARFOSS, Jr.

REFERENCES CITED

The following references are of record in the file of this patent:

UNITED STATES PATENTS

| Number | Name | Date |
| --- | --- | --- |
| 1,780,250 | Strong | Nov. 4, 1930 |
| 2,394,109 | Sanchez | Feb. 5, 1946 |